(12) United States Patent
Lin (10) Patent No.: US 7,219,228 B2
(45) Date of Patent: May 15, 2007

(54) METHOD AND APPARATUS FOR DEFENDING AGAINST SYN PACKET BANDWIDTH ATTACKS ON TCP SERVERS

(75) Inventor: Dong Lin, Fort Lee, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 772 days.

(21) Appl. No.: 10/674,208

(22) Filed: Sep. 29, 2003

(65) Prior Publication Data

US 2005/0050358 A1   Mar. 3, 2005

Related U.S. Application Data

(60) Provisional application No. 60/497,886, filed on Aug. 25, 2003.

(51) Int. Cl.
 *G06F 9/00* (2006.01)
(52) U.S. Cl. ............... 713/160; 713/161; 713/165; 713/166
(58) Field of Classification Search ............... 713/160, 713/161, 165, 166
See application file for complete search history.

(56) References Cited

OTHER PUBLICATIONS

U.S. Appl. No. 10/668,952, filed Sep. 23, 2003, Lin, D.
Bernstein, D.J., "*SYN Cookies*," http://cr.yp.to/syncookies.html.
CERT Coordination Center, "*TCP SYN Flooding And IP Spoofing Attacks*," Sep. 1996. http://www.cert.org/advisories/CA-1996-21.html.
Lemon, J. "*Resisting SYN Flood DoS Attacks With A SYN Cache*," USENIX BSDCon 2002 Conference, San Francisco, CA. http://people.freebsd.org/~jlemon/papers/syncache.pdf.
Lin, D., "*Internet Congestion Control: Cooperative End-System And Gateway Algorithms*," Ph.D Thesis, Harvard University, 1998. http://www.eecs.harvard.edu/~dong/lin-thesis.ps.
"*Transmission Control Protocol*," prepared for Defense Advanced Research Projects Agency by Information Sciences Institute, J. Postel, Editor, Request for Comments (RFC) 793, Sep. 1981. http://www.faqs.org/rfcs/rfc793.html.
RAZOR Security Team, "*The Naptha DoS Vulnerabilities*," Nov. 2000. http://razor.bindview.com/publish/advisories/adv_NAPTHA.html.
"*Requirements For Internet Hosts—Communication Layers*," Internet Engineering Task Force, R. Braden, Editor, Network Working Group, Request for Comments (RFC) 1122, Section 4.2.3.6, Oct. 1989. http://www.faqs.org/rfcs/rfc1122.html.

*Primary Examiner*—Thomas R. Peeso
(74) *Attorney, Agent, or Firm*—Kenneth M. Brown (57) ABSTRACT

A SYN packet bandwidth Distributed Denial-of-Service (DDoS) attack is defended against by intercepting and identifying SYN packets in a "DDoS gateway" advantageously positioned at the edge of the network to be protected (e.g., one hop upstream from the protected link), and by queuing these intercepted SYN packets in a separate queue from other TCP packet queues. Edge per-flow queuing is employed to provide isolation among individual TCP connections sharing the link. A fair scheduling algorithm such as round robin scheduling is used to ensure that SYN packets (such as those generated as part of a SYN bandwidth attack) cannot overwhelm the egress link in the presence of other TCP packets.

20 Claims, 5 Drawing Sheets

METHOD AND APPARATUS FOR DEFENDING AGAINST SYN PACKET BANDWIDTH ATTACKS ON TCP SERVERS

CROSS-REFERENCE TO RELATED APPLICATION

The present application hereby claims the benefit of previously filed Provisional patent application Ser. No. 60/497,886, "Defense Against State Attacks On TCP Servers," filed by D. Lin on Aug. 25, 2003.

FIELD OF THE INVENTION

The present invention relates generally to the field of Internet security and more particularly to the problem of defending against certain forms of denial of service (DDoS) attacks known as SYN bandwidth attacks.

BACKGROUND OF THE INVENTION

Denial of service (DoS) attacks cause service disruptions when limited server resources are allocated to the attackers instead of to legitimate users. A distributed denial of service (DDoS) attack launches a coordinated DoS attack toward the victim from geographically diverse Internet nodes. The attacking machines are usually compromised zombie machines controlled by remote masters. The resources typically under attack include link bandwidth, server memory and CPU time. Distributed DoS attacks are more potent because of the aggregate effects of converging traffic, especially when the attackers have inside knowledge of the network topology. "TCP SYN flood," "smurf IP ping," and bandwidth attacks on root name servers are all examples of such attacks which have been previously deployed. (Each of these attacks will be familiar to those skilled in the art.) However, it has been reported that there have in fact been far more of such attacks than have been previously known.

There are numerous approaches to improve server operating systems to resist resource exhaustion. Some have considered better network protocol design principles to protect servers from attacks on stateful handshake protocols (familiar to those of ordinary skill in the art). IP trace back is another well-known approach—it is a network-wide coordinated effort to follow the offending packets back to their originators. However, such an approach obviously requires network-wide cooperation and coordination.

Moreover, DDoS attack tools may tend to mutate and evolve over time. With wider deployment of egress filtering, for example, attackers will undoubtedly exploit doors that are most likely to be left open (e.g., TCP, DNS). Attack signatures may change or disappear to evade detection. Thus, it is likely that sophisticated future attacks will become almost indistinguishable from legitimate ones. A filtering-based approach to the problem alone is, therefore, not only inefficient but also insufficient. Many false positives will force researchers to go back to the drawing board for new heuristics.

One particular type of DDoS attack on a TCP server can be launched by continuously creating new TCP connections with the targeted server until its limited resources are exhausted and it therefore becomes unable to accept service requests from legitimate users. (As is familiar to those of ordinary skill in the art, TCP is the well-known Department of Defense standard Transmission Control Protocol—see, e.g., "Transmission Control Protocol," prepared for Defense Advanced Research Projects Agency by Information Sciences Institute, J. Postel, editor, Request for Comments (RFC) 793, September, 1981, "www.faqs.org/rfcs/rfc793.html." RFC 793 is hereby incorporated by reference as if fully set forth herein.) Specifically, such attacks are known as "SYN attacks" since they consist of no more than an immense flurry of initial SYN packets which are sent to initiate new TCP connections. (SYN packets are connection request packets, fully familiar to those of ordinary skill in the art. They are defined and described in, for example, the TCP standard, RFC 793, referenced above.)

More particularly, as is well known to those skilled in the art, every TCP connection starts with a SYN packet. TCP servers must respond to every valid SYN request with a SYN, ACK and must retransmit it if necessary. (ACK packets are acknowledgement packets, also defined and described in RFC 793 and fully familiar to those skilled in the art.) SYN packets penetrate transient firewalls without prior states in them. They also cause servers and firewalls to allocate resources in preparation for new connections. As a result, they are the first potential vehicle for launching denial of service attacks.

In fact, there are two different forms of SYN attacks— SYN state attacks and SYN bandwidth attacks. SYN state attacks attempt to overwhelm a TCP server by sending connection request SYN packets without completing the rest of the handshake, causing the "backlog queue" on the server to eventually overflow, and thereby causing a denial of service to legitimate requests. (As is well known to those of ordinary skill in the art, TCP connections are established via a three-way handshake, with incomplete connections typically being held in a per-listener queue. The limit of this backlog queue is usually rather small.) However, at least two solutions already exist which allow TCP servers to defend against SYN state attacks by themselves—one is to reduce the amount of memory used for incomplete connections, and the other is to eliminate any memory usage entirely.

The other form of SYN attack however is a SYN bandwidth attack. SYN bandwidth attacks are more difficult to deal with "downstream" (i.e., at the TCP server under attack). Note that a typical SYN packet is no more than 64 bytes long. A burst of such minimum size packets can therefore cause livelock on the server. (As is well known to those of ordinary skill in the art, "livelock" is a condition which occurs when two or more processes continuously change their state in response to changes in the other process or processes without doing any useful work.) That is, a deadly attack could consist of simply blasting the server's ingress link with many such small packets. Although many optimizations exist to avoid receiver livelocks, in general bandwidth attacks have heretofore only been dealt with further "upstream"—i.e., before the damage is done at the server.

SUMMARY OF THE INVENTION

The present inventor has recognized that SYN bandwidth attacks can be effectively dealt with "downstream" by intercepting and identifying SYN packets in a "DDoS gateway," advantageously positioned at the edge of the network to be protected (e.g., one hop upstream from the protected link), and then, in accordance with the principles of the present invention, by queuing these intercepted SYN packets separately from other TCP packets. In particular, in accordance with one illustrative embodiment of the present invention, edge per-flow queuing is advantageously employed in a DDoS gateway in order to provide isolation among different protocols and isolation among individual TCP connections sharing the link. (Per-flow queuing techniques are familiar to those of ordinary skill in the art.)

Moreover, in accordance with the principles of the present invention, SYN packets are queued separately from other TCP packets. Then, the egress scheduler of the DDoS gateway advantageously gives a fair share to each of the non-empty queues (which advantageously includes a separate queue for the SYN packets), thereby ensuring that the SYN packets (such as, for example, those generated as part of a SYN bandwidth attack) cannot overwhelm the egress link in the presence of other packets. Moreover, such a scheduling scheme advantageously interleaves 64 byte packets with data packets that are typically larger, thereby reducing the likelihood of causing livelock at downstream TCP servers.

BRIEF DESCRIPTION OF THE DRAWINGS

FIG. 4 shows an illustrative example of a queuing operation in accordance with an illustrative embodiment of the present invention.

FIG. 4B shows the queue structure as modified after the departure of the given packet.

DETAILED DESCRIPTION

Figure 1:
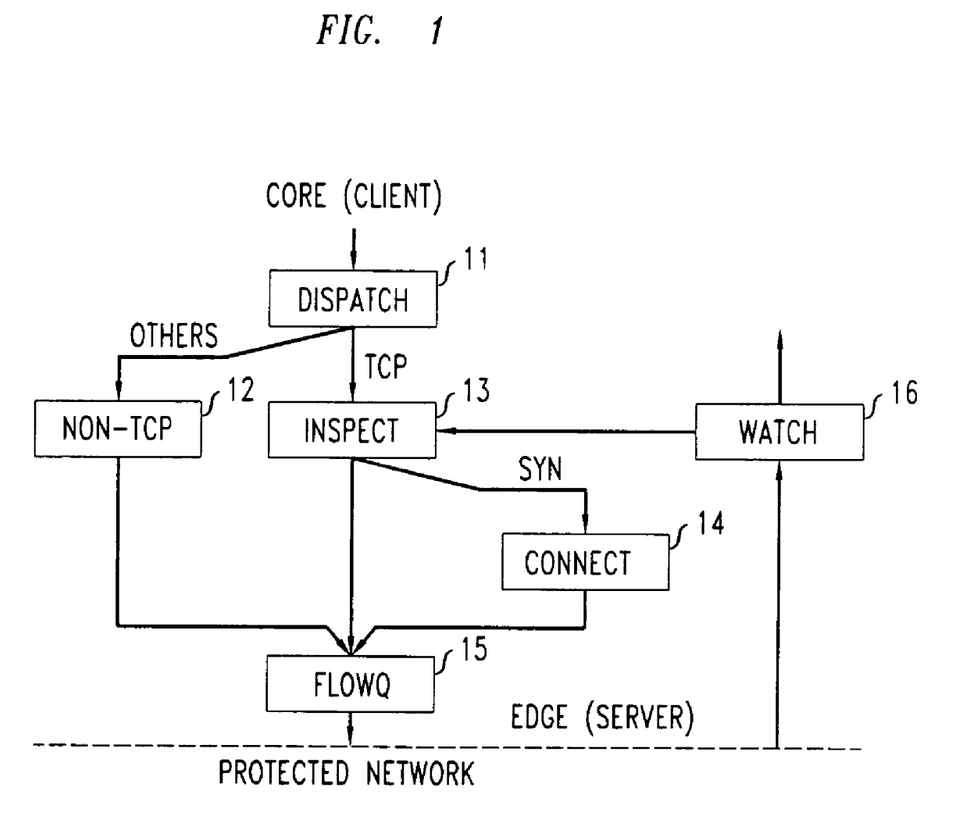
FIG. 1 shows a functional block diagram of a DDoS gateway which incorporates a SYN bandwidth attack defense mechanism in accordance with an illustrative embodiment of the present invention.

FIG. 1 shows a functional block diagram of a DDoS gateway which incorporates a SYN bandwidth attack protection mechanism in accordance with an illustrative embodiment of the present invention. The illustrative DDoS gateway is advantageously positioned at network edges, one hop upstream from the link to be protected. In operation of the illustrative gateway, packets arriving from the core are first dispatched by Dispatch module 11, to isolate TCP packets from others. (Non-TCP packets are handled by Non-TCP module 12.) Data packets with prior states at the gateway may be sorted into various queues, subject to certain buffer management policies, as determined by Inspect module 13. SYN packets, however, do not require prior states to be forwarded and are thus advantageously handled separately by Connect module 14. Data packets, SYN packets, and packets from non-TCP protocols are then scheduled to appear on the protected link by FlowQ module 15. For the reverse direction, packets from the TCP servers are examined by Watch module 16, and provide stateful information for further handling of incoming packets from the core. The SYN bandwidth attack protection mechanism in accordance with the illustrative embodiment of the present invention and as described in detail below may be advantageously incorporated into FlowQ module 15.

In accordance with the illustrative embodiment of the present invention, instead of storing and passing through SYN packets blindly, exponential gaps between adjacent SYN packets from the same connection are advantageously enforced. Like other retransmissions, TCP protocol specifies that retransmissions for SYN packets follow the same exponential back off time intervals for data packets. With an initial interval of 500 milliseconds, for example, subsequent SYN packets arriving before the current interval time are advantageously dropped. Incomplete connections that have lasted over a extended period of time are removed if they are not evicted by new connection requests by then. The illustrative system further ensures that each incomplete connection has no more than one SYN packet in the queue. This eliminates the possibility that the egress link be flooded by a small number of incomplete connections.

In order to prevent randomly generated SYN packets from creating a large number of states in the gateway and flooding the egress link, the total number of incomplete connections permitted in the illustrative system is advantageously set in proportion to the number of currently established connections as follows:

$$P = M + c*N, \tag{1}$$

where M and c are constants and N is the number of established connections in the system. Note that legitimate TCP connection requests would almost certainly turn into established ones. Therefore, the number of legitimate requests and the number of established connections will, in general, be closely correlated. The constant c may, for example, be set to the value two. M is a number of requests allowed with no active connections in the system for a head start. Illustratively, M=100.

In accordance with the illustrative embodiment of the present invention, when a new SYN packet arrives without a prior state, a new state is allocated if the condition specified in Equation (1) holds. Otherwise, a randomly chosen state is evicted. (Note that in other illustrative embodiments of the present invention, aging may be used instead of random selection. However, random selection is preferred over aging because it's more friendly to connections with long round-trip times when the system is in fact under attack.) A connection is moved from the incomplete state to the established state when a valid returning ACK packet passes through. Note that the time taken for the transition is largely dependent on the round-trip time between the server and the client. If a retransmitted SYN packet arrives, the exponential interval gap is checked. Accepted packets are queued into a FIFO buffer. If a packet buffer is unavailable, the packet buffer manager removes a packet from the system. See below for details on buffer management.

In accordance with another illustrative embodiment of the present invention, a TCP handshake proxy is used which forwards the initial SYN packet and all of the server's responses. This proxy performs SYN retransmission on behalf of a client if necessary until the client returns a valid ACK or a connection time-out occurs. This proxy approach works well, but it requires more connection states to be stored at the gateway for SYN retransmission and is more expensive to implement.

Note that at network edges, ingress links from the network core are normally faster than egress links toward end customers' networks. Thus, egress links can be flooded if ingress packet arrival rates are higher than the link capacity. However, as is well known to those skilled in the art, TCP is a congestion aware transport protocol which throttles back the packet rate upon detection of congestion. As a result, a malicious user can force other legitimate TCP connections to reduce their usage on the egress link without massively flooding the link. This phenomenon also occurs at the presence of connections driven by aggressive TCP implementations, malicious or not.

Therefore, to protect legitimate TCP flows, fair scheduling and fair buffer management mechanisms are advantageously employed in accordance with the illustrative embodiment of the present invention. In particular, the illustrative FlowQ module of FIG. 1 advantageously implements a fair scheduling and fair dropping buffer management scheme.

Specifically, in accordance with this illustrative embodiment of the present invention, TCP data packets arriving from the core network and destined for the same output interface are first sorted into flow queues. In accordance with this illustrative embodiment, a flow is defined as a single TCP connection identified by its source destination addresses and port numbers. (In accordance with other illustrative embodiments of the present invention, flows may be defined and flow queues implemented, for example, either for each set of packets belonging to a single source and destination host pair, or for each set of packets from a single source host or source network.) An egress packet scheduler then advantageously manipulates these flow queues for ordered packet departure. Packets arrive on input ports and depart on output ports. The DDoS gateway of the illustrative embodiment of the present invention uses an output port buffering architecture. (Note that the term "port" will be used herein to represent any physical network interface.)

The illustrative output port per-flow queuing and buffer sharing architecture has two interfaces at each output port—the arrival side and the departure side. The arrival side may receive packets from the input ports at a rate higher than the output port line speed, causing packets to be buffered and delayed. The departure side serves multiple flows that have packets queued. As a result, it is advantageous that the buffer management policy adapted by the illustrative embodiment of the present invention advantageously demonstrates two distinct properties:

(1) Fair scheduling at departure ensures that all competing flows are entitled to the same bandwidth resource.

(2) Fair dropping at arrival ensures that no flows use more buffers at the expense of others.

Note that with unfair scheduling schemes, some flows can obtain higher bandwidth even if they do not use more buffers than others. And with unfair buffer allocation, a flow may not have packets to send even if the scheduling scheme is completely fair.

Given per-flow queuing, round robin scheduling is known to those skilled in the art to be "max-min" fair. Note also that bit by bit round-robin scheduling can be efficiently approximated to work with variable packet lengths. A typical packet discard algorithm for per-flow queues is straightforward: Accept all incoming packets as long as there are free buffers. When a packet arrives without any free buffers, drop a packet from a flow with the most bytes buffered.

To avoid unnecessary purging (in which an accepted packet is immediately replaced by the next arrival), and to prevent TCP flows from falling into time-outs due to tiny windows, the incoming packets are advantageously not dropped when the longest queue has only two packets. Clearly, this limits the maximum number of flows to be one half of the total buffer size committed to the system.

Figure 2:
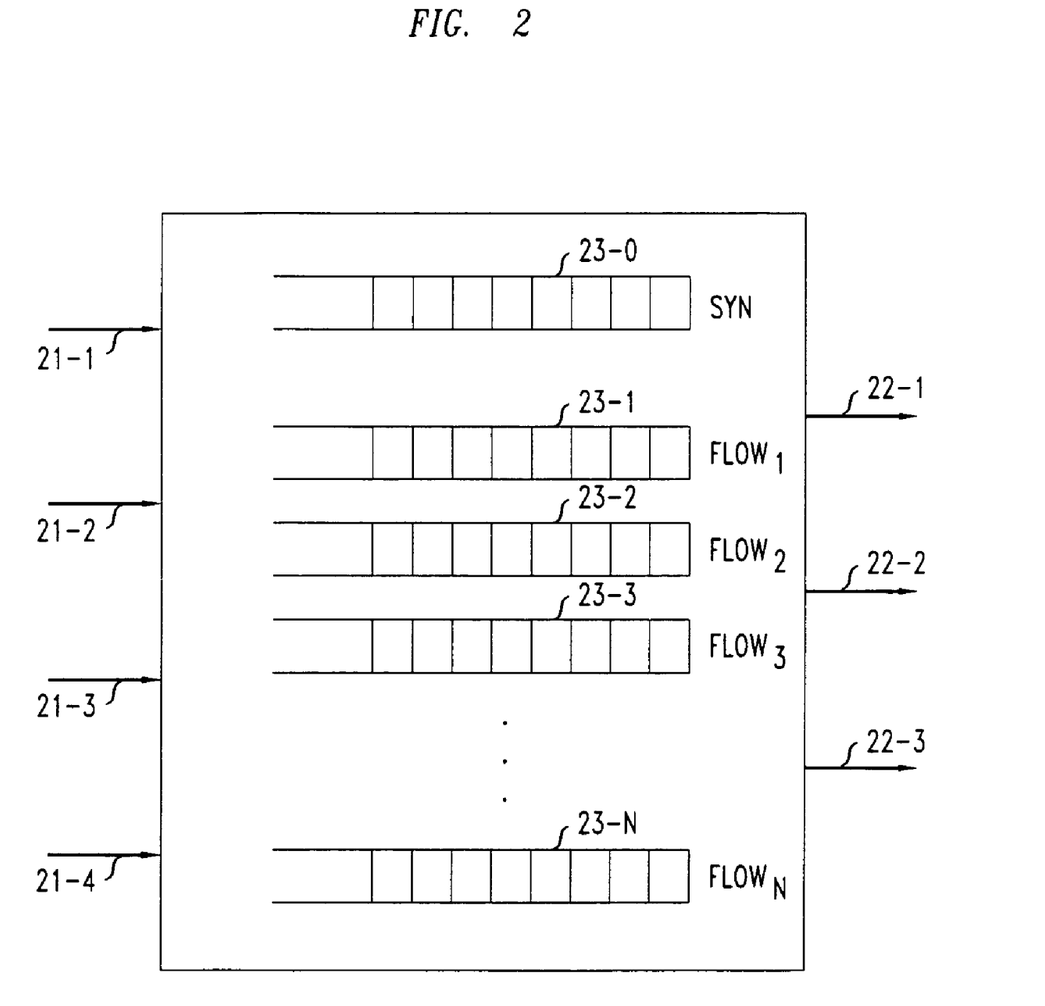
FIG. 2 shows an illustrative (conceptual) structural diagram of the illustrative DDoS gateway of FIG. 1 for defending against a SYN bandwidth attack in accordance with an illustrative embodiment of the present invention.

FIG. 2 shows an illustrative (conceptual) structural diagram of the illustrative DDoS gateway of FIG. 1 for defending against a SYN bandwidth attack in accordance with an illustrative embodiment of the present invention. The illustrative gateway comprises a plurality of input (i.e., ingress) ports 21-1 through 21-4 and a plurality of output ("egress") ports 22-1 through 22-3. In addition, the gateway comprises a (large) plurality of N per-flow queues, 23-1 through 23-N, as well as SYN queue 23-0 for exclusive use in queuing SYN packets. Each of the flow queues 23-1 through 23-N is used to queue the TCP packets associated with a distinct TCP connection (i.e., flow), while SYN queue 23-0 holds only SYN packets. In operation, a round robin fair scheduling approach is advantageously employed, wherein packets from each of the (N+1) queues is processed in turn. Thus, a SYN bandwidth attack, which can cause SYN queue 23-0 to be filled, will not significantly interfere with the scheduling and transmission of packets from the other (N) queues.

Figure 3:
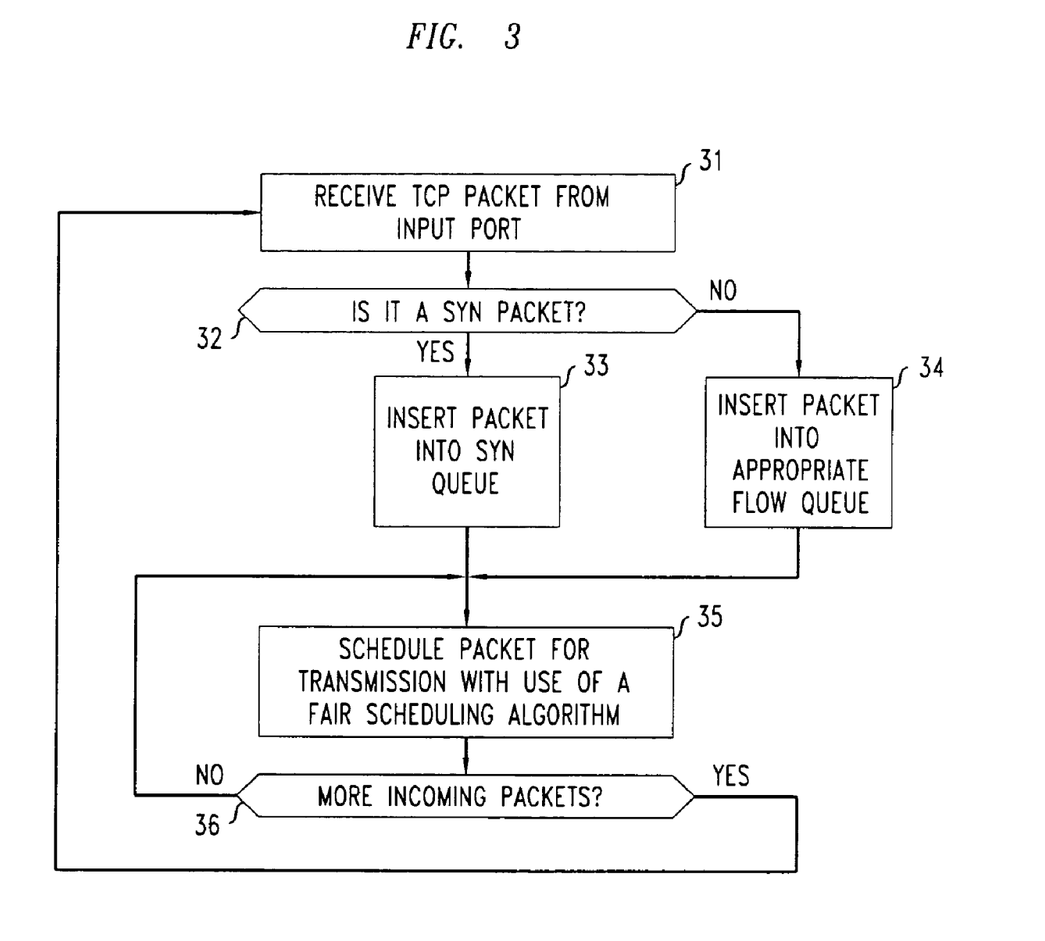
FIG. 3 shows a flowchart of the operation of the illustrative DDoS gateway of FIG. 1 for use in defending against a SYN bandwidth attack in accordance with an illustrative embodiment of the present invention.

FIG. 3 shows a flowchart of the operation of the illustrative gateway of FIG. 1 for use in defending against a SYN bandwidth attack in accordance with an illustrative embodiment of the present invention. The operation of the illustrative gateway begins by receiving a TCP packet from one of the input ports (block 31), and determining whether it is a SYN packet (decision block 32). If it is a SYN packet, it is advantageously inserted into the SYN queue (block 33). If it is not a SYN packet, it is inserted into the appropriate flow queue (block 34). Then, the packet is scheduled for transmission based on a fair scheduling algorithm such as, for example, round robin scheduling (block 35). If there is another incoming packet to be queued (decision block 36), flow returns to block 31. Otherwise, queued packets continue to be transmitted.

As pointed out above, implementations of round robin scheduling are well known to those of ordinary skill in the art. In addition, it is well known to drop packets (when necessary) from the longest flows (e.g., flows with the most packets queued or the most bytes queued). In accordance with a preferred illustrative embodiment of the present invention, however, flows are advantageously sorted based on their queue lengths, which may illustratively be measured either in terms of number of packets or in terms of number of bytes, using a constant amount of work per packet.

Specifically, in accordance with one illustrative embodiment of the present invention, it will be assumed that all packets are of the same size. In other words, assume that queue length is measured in units of packets (rather than in bytes). The illustrative system advantageously maintains a chain of lists. Each sublist contains all flows with identical queue lengths. These sublists are then sorted according to the queue length in descending order. Note that initially, all lists are empty, since all flows have empty queues.

When a packet for $flow_i$ arrives with free buffers available, it is accepted and appended to the $flow_i$ queue, having length $Q_i$. Thus, the queue length increases to $Q_i+1$. The system removes $flow_i$ from its current sublist $SL(Q_i)$ and appends it to sublist $SL(Q_i+1)$. This sublist should be either one item away from $SL(Q_i)$ because they differ by exactly one packet, or does not exist if no flow has a queue length of $Q_i+1$ before the arrival. In the latter case, the system simply creates a list and inserts it before $SL(Q_i)$. In both cases, note that no scanning of any list is required in order to maintain the ordered master list.

Figure 4A:
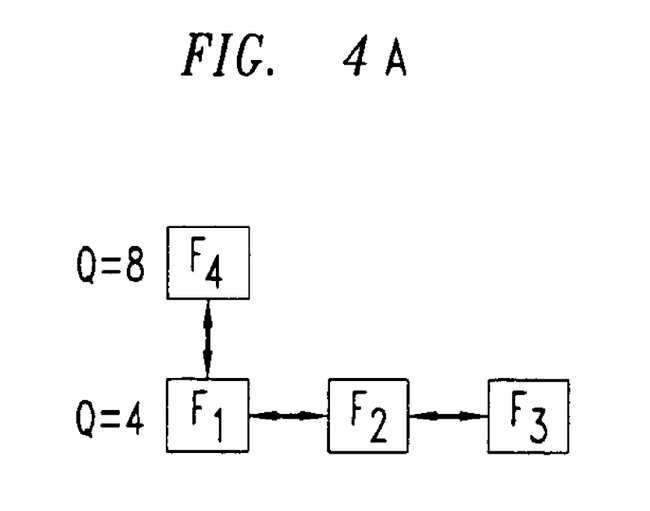
FIG. 4A shows the queue structure before the arrival of a new packet.
Figure 4B:
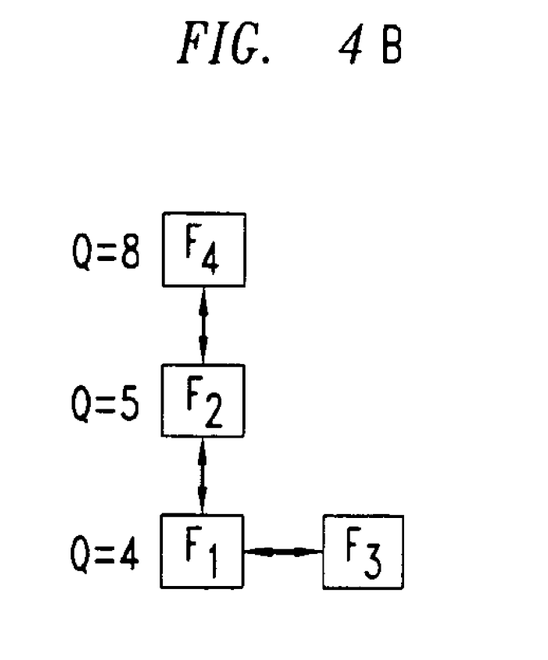
FIG. 4B shows the queue structure as modified after the arrival of the given packet.

FIG. 4 shows an illustrative example of such an queuing operation in accordance with the illustrative embodiment of the present invention. FIG. 4A shows the queue structure before the arrival of a new packet for $flow_2$; and FIG. 4B shows the queue structure as modified after the arrival of the given packet. Note that as a result of the added packet, $flow_2$ is advantageously removed from SL(Q=4) and inserted into SL(Q=5).

When a packet for flows is scheduled and departs, it is removed from the $flow_i$ queue having length $Q_i$. The queue length thereby decreases to $Q_i-1$. The illustrative system removes $flow_i$ from its current sublist $SL(Q_i)$, and then attaches it to the beginning of sublist $SL(Q_i-1)$ if $Q_i>1$. Note that $SL(Q_i-1)$ is advantageously created if necessary. The old sublist $SL(Q_i)$ is advantageously removed and deleted if empty. Once again, no linear scanning is needed.

Figure 5A:
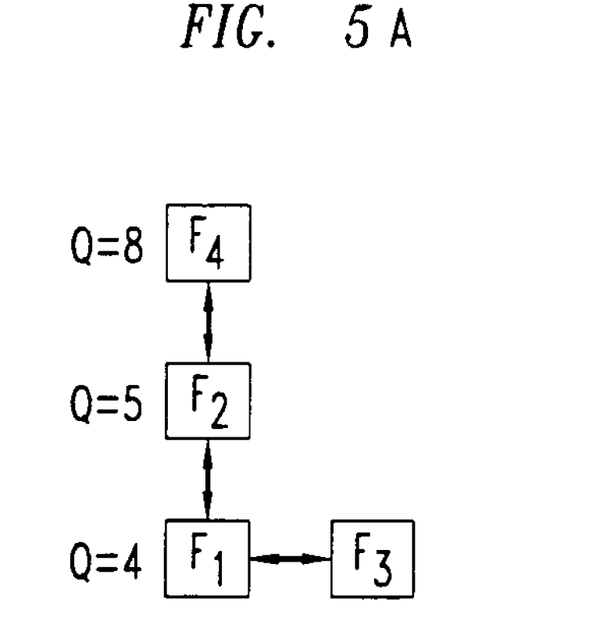
FIG. 5A shows the queue structure before the departure of a scheduled packet.
Figure 5B:
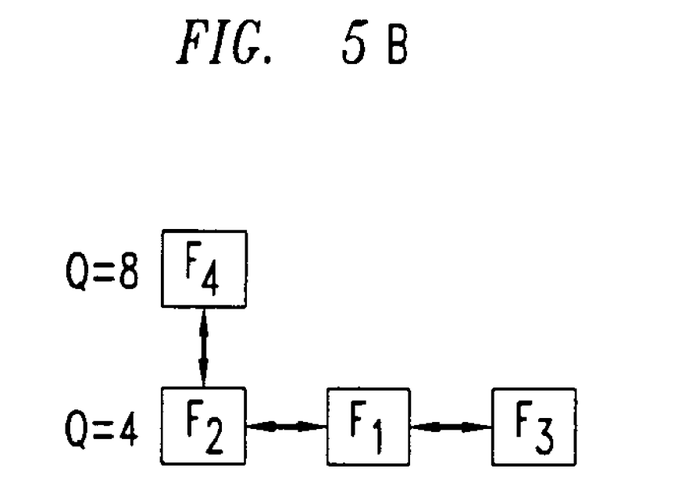
FIG. 5 shows an illustrative example of a queue entry removal operation in accordance with an illustrative embodiment of the present invention.

FIG. 5 shows an illustrative example of such a queue entry removal operation in accordance with the illustrative embodiment of the present invention. FIG. 5A shows the queue structure before the departure of a packet scheduled from $flow_2$; and FIG. 5B shows the queue structure as modified after the departure of the given packet. Note that the removal of the packet, $flow_2$ is advantageously removed from SL(Q=5) and inserted into SL(Q=4).

When a packet for $flow_i$ arrives on a full buffer, a $flow_j$ with the longest queue length can be found from the first sublist in the sorted master list. The illustrative system purges a packet from $flow_j$ if $i \neq j$ and accepts the incoming packet. Otherwise the arriving packet is advantageously dropped. Note that the operations associated with purging a packet are identical to those used in scheduling a packet for departure.

In accordance with another illustrative embodiment of the present invention wherein packets may be of variable length, the queue length has the unit of bytes and each sublist contains all flows with the same value of $[Q_i/MTU]$, where MTU is the maximum packet size and [ ] represents the mathematical ceiling function. Similar operations are performed on arrivals and departures. When $flow_i$ with $Q_i$ is added to $SL([Q_i/MTU])$, it is advantageously appended if ($Q_i$ modulo MTU)<MTU/2 and attached to the beginning otherwise. This ensures the sorting error within the sublist is less than MTU/2. Note that it may be possible that an arrival or a departure of a small packet does not cause its flow to be moved to a neighboring sublist, but instead, it is attached to the beginning or appended to the same sublist depending on whether the updated queue length crosses the MTU/2 boundary.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

I claim:

1. A method for distributing TCP packets in a network with use of a gateway, the gateway comprising one or more input ports, one or more output ports, and a plurality of queues, at least one of said plurality of queues having been designated as a SYN queue, the method comprising:
receiving a TCP packet from one of said input ports;
determining whether the TCP packet is a SYN packet;
inserting the TCP packet into one of said SYN queues if it is a SYN packet;
inserting the TCP packet into one of said plurality of queues which is not one of said SYN queues if it is not a SYN packet; and
scheduling the TCP packet for transmission via one of said output ports based on a fair scheduling algorithm.

2. The method of claim 1 wherein the fair scheduling algorithm comprises a round robin scheduling algorithm.

3. The method of claim 1 wherein said plurality of queues which are not one of said SYN queues comprise per-flow queues, each per-flow queue for storing TCP packets associated with a separate TCP connection flow.

4. The method of claim 1 wherein each of said plurality of queues which are not one of said SYN queues have queue lengths associated therewith, and wherein said step of inserting the TCP packet into one of said plurality of queues which is not one of said SYN queues comprises maintaining said plurality of queues which are not one of said SYN queues as a chain of sublists of queues sorted according to said queue lengths associated therewith.

5. The method of claim 1 wherein each of said plurality of queues which are not one of said SYN queues have queue lengths associated therewith, and wherein said step of transmitting a plurality of packets from said plurality of queues to said one or more output ports comprises removing each of said transmitted packets from said plurality of queues and maintaining said plurality of queues which are not one of said SYN queues as a chain of sublists of queues sorted according to said queue lengths associated therewith.

6. The method of claim 1 further comprising the step of removing a previously inserted SYN packet from one of said SYN queues if said TCP packet is a SYN packet and said SYN queues are full.

7. The method of claim 6 wherein said previously inserted SYN packet removed from said one of said SYN queues is chosen at random.

8. The method of claim 1 further comprising the step of removing a previously inserted TCP packet which is not a SYN packet from one of said plurality of queues which is not one of said SYN queues if said TCP packet is not a SYN packet and said plurality of queues which are not SYN queues are full.

9. The method of claim 8 wherein said previously inserted TCP packet is removed from a largest one of said plurality of queues which is not one of said SYN queues.

10. The method of claim 1 wherein the SYN queues have a capacity associated therewith, said capacity providing for a maximum number of permitted incomplete connections, wherein the plurality of queues which are not SYN queues have a number of established connections associated therewith, and wherein said maximum number of permitted incomplete connections is mathematically proportional to the number of established connections.

11. A network gateway for distributing TCP packets in a network, the gateway comprising one or more input ports, one or more output ports, and a plurality of queues, at least one of said plurality of queues having been designated as a SYN queue, the gateway further comprising a processor adapted to:
  receive a TCP packet from one of said input ports;
  determine whether the TCP packet is a SYN packet;
  insert the TCP packet into one of said SYN queues if it is a SYN packet;
  insert the TCP packet into one of said plurality of queues which is not one of said SYN queues if it is not a SYN packet; and
  schedule the TCP packet for transmission via one of said output ports based on a fair scheduling algorithm.

12. The gateway of claim 11 wherein the fair scheduling algorithm comprises a round robin scheduling algorithm.

13. The gateway of claim 11 wherein said plurality of queues which are not one of said SYN queues comprise per-flow queues, each per-flow queue for storing TCP packets associated with a separate TCP connection flow.

14. The gateway of claim 11 wherein each of said plurality of queues which are not one of said SYN queues have queue lengths associated therewith, and wherein said inserting of the TCP packet into one of said plurality of queues which is not one of said SYN queues comprises maintaining said plurality of queues which are not one of said SYN queues as a chain of sublists of queues sorted according to said queue lengths associated therewith.

15. The gateway of claim 11 wherein each of said plurality of queues which are not one of said SYN queues have queue lengths associated therewith, and wherein said transmitting of a plurality of packets from said plurality of queues to said one or more output ports comprises removing each of said transmitted packets from said plurality of queues and maintaining said plurality of queues which are not one of said SYN queues as a chain of sublists of queues sorted according to said queue lengths associated therewith.

16. The gateway of claim 11 wherein the process is further adapted to remove a previously inserted SYN packet from one of said SYN queues if said TCP packet is a SYN packet and said SYN queues are full.

17. The gateway of claim 16 wherein said previously inserted SYN packet removed from said one of said SYN queues is chosen at random.

18. The gateway of claim 11 wherein the processor is further adapted to remove a previously inserted TCP packet which is not a SYN packet from one of said plurality of queues which is not one of said SYN queues if said TCP packet is not a SYN packet and said plurality of queues which are not SYN queues are full.

19. The gateway of claim 18 wherein said previously inserted TCP packet is removed from a largest one of said plurality of queues which is not one of said SYN queues.

20. The gateway of claim 11 wherein the SYN queues have a capacity associated therewith, said capacity providing for a maximum number of permitted incomplete connections, wherein the plurality of queues which are not SYN queues have a number of established connections associated therewith, and wherein said maximum number of permitted incomplete connections is mathematically proportional to the number of established connections.

* * * * *